Jan. 16, 1934.   W. D. FOSTER   1,944,027
FILM HANDLING APPARATUS
Filed May 26, 1932   2 Sheets-Sheet 1

INVENTOR.
WARREN DUNHAM FOSTER.
BY
ATTORNEY.

Jan. 16, 1934. W. D. FOSTER 1,944,027
FILM HANDLING APPARATUS
Filed May 26, 1932   2 Sheets-Sheet 2
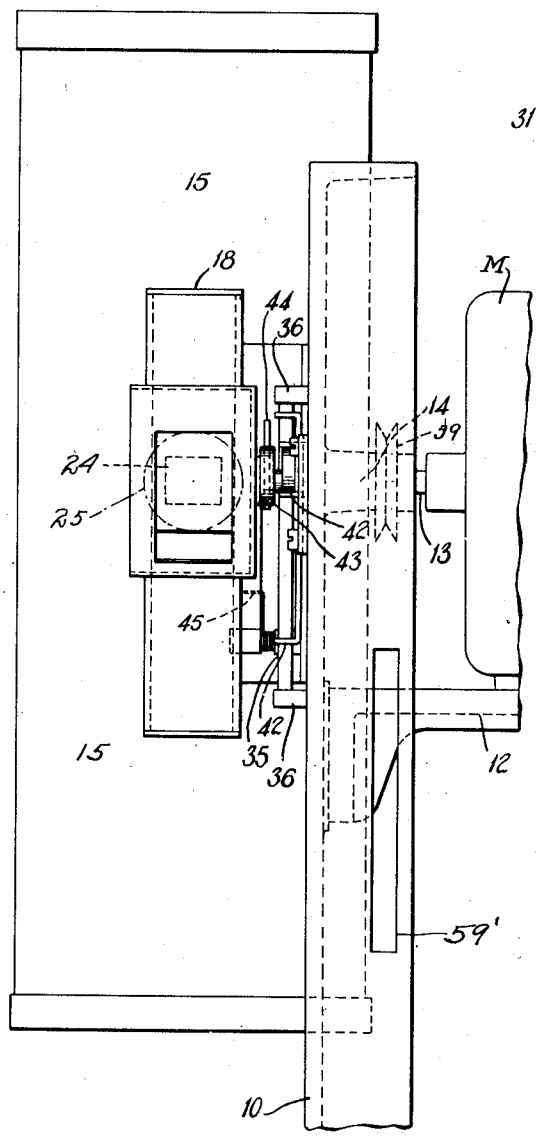
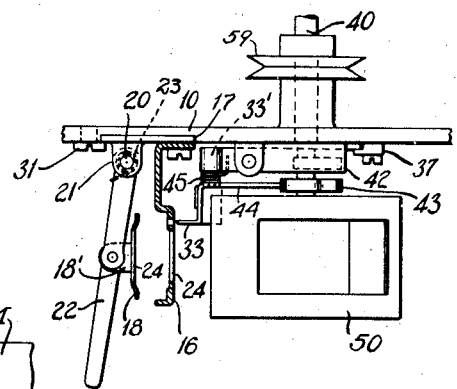
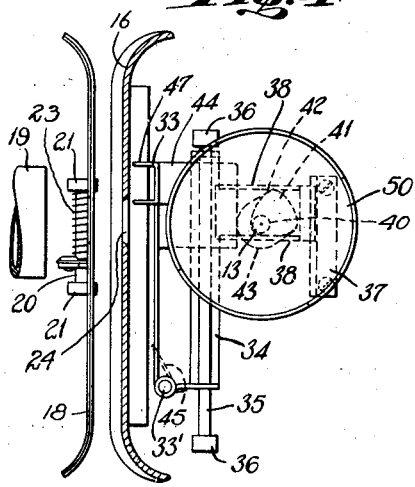
INVENTOR.
WARREN DUNHAM FOSTER.
BY Warren D. Foster
ATTORNEY.

Patented Jan. 16, 1934

1,944,027

UNITED STATES PATENT OFFICE 1,944,027

FILM HANDLING APPARATUS

Warren Dunham Foster, Washington Township, Bergen County, N. J., assignor to Kinatome Patents Corporation Application May 26, 1932. Serial No. 613,661

10 Claims. (Cl. 88—17)

The present invention relates broadly to film handling apparatus and more particularly to apparatus for projecting or photographing motion pictures with or without provision for the reproduction or recordation of sound.

One object of the present invention is to provide an improved projector which can be easily operated by amateurs and can be inexpensively constructed. A further chief object of the invention is to provide a simple projector of a relatively few parts compactly and effectively arranged so that the apparatus will occupy but a small amount of space when boxed for shipment or when being transported or stored by the user.

A further object of the invention is to provide an inexpensive projector arranged for use with means for feeding the film which dispense with the usual upper and lower loops which often give trouble especially in machines operated by amateurs.

To secure an efficient and inexpensive apparatus, I mount a barrel shutter directly on the shaft of the driving motor, which shaft is extended for that purpose. Also carried on the same shaft are driving means for operating the intermittent film feeding movement of the apparatus. The take up and delivery reels are driven by belts from pulleys on this same motor shaft which operates the shutter and feeding mechanism. By this construction, relatively few parts are required, and yet a sturdy and durable machine is obtained.

Another object of my invention is to provide improved, simplified and inexpensive means for "framing" the picture. In many projectors designed for amateur use, this framing operation is secured by the movement of one apertured member of the gate relative to the opposite gate member which remains relatively fixed. In a projector built in accordance with the present invention, I bodily mount the gate upon a slide, or form such a slide integrally with the gate, and bodily move the entire gate, for framing purposes, by moving the slide. Such construction provides for the easy removal of the entire gate as a unit, for cleaning, repair, or renewal. Such design obviously simplifies and cheapens the original manufacture of the apparatus.

While I show in the accompanying drawings which form a part of this specification my invention embodied in a preferred form of motion picture apparatus, it will be understood that certain features of the invention may be embodied in other widely different forms of film handling apparatus without departing from the spirit of my invention and the scope of my broader claims.

Figure 2 is an end elevation, partly broken away, of the structure shown in Figure 1.

Figure 3 is a partial top view of the structure shown in Figure 1.

Figure 4 is a partial side view, to an enlarged scale, of the structure shown in Figure 1.

Figure 1:
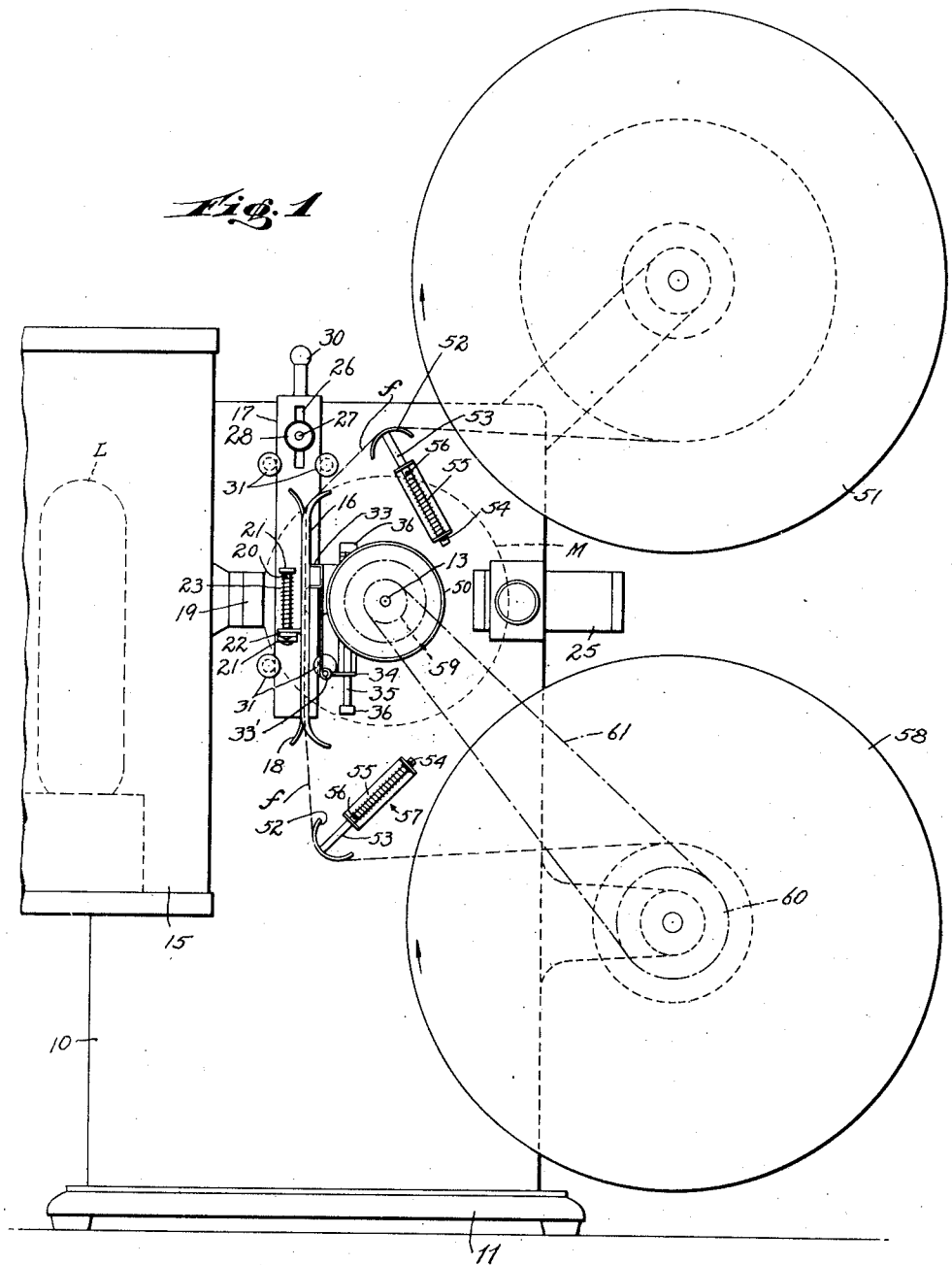
Figure 1 is a side elevation of one form of my invention applied to a motion picture projector.

There may be provided a mounting plate or frame 10 supported on an integral base 11. A bracket shelf 12 may be strongly and rigidly fastened to the frame 10 or be made integrally therewith. On the shelf 12, a small motor M may be mounted and have a shaft 13 which extends through an apertured bearing boss 14 on the frame 10 and beyond the opposite side of the frame. A usual type of electrical lamp L may be mounted in a lamp house 15 supported on the rear of the frame 10. A gate device for cooperation with the lamp in the lamp house may include a fixed gate section 16 which, as can be seen from inspection of Figure 3, can be inexpensively made from sheet metal by a stamping operation and be easily mounted on a plate 17 or made integral therewith which may be adjustably mounted on the frame 10 in a way presently to be described. A movable gate section 18 can be inexpensively made of sheet metal and be yieldingly urged against a film disposed between it and the fixed section 16 by means which include a vertical arbor or pintle 20 journalled in two ears 21 integrally formed on the plate 17, the shaft having fastened rigidly to it a laterally extending handle member 22 to which the gate section 18 is pivotally fastened by means of a lug 18' which may be bent from the gate section 18. The hole in the lug 18' for fastening it on the lever 22 is slightly oversize which permits a small desirable rocking movement of the gate section 18 toward and away from the film. A spring 23 around the arbor 20 is arranged normally to urge the member 22 counter clockwise, which will be effective to press the section 18 lightly against the film between it and the section 16. The central portion of one of the gate sections is relieved in a usual way, and usual apertures 24 are provided in the gate sections for cooperation with a condensing lens 19 on the lamp house and an objective lens device 25 which may be mounted on the frame 10. These lenses may be of a well-known kind which it is not considered necessary to describe for an understanding of the present invention. In some cases it may be desirable to construct the gate described above as is shown in the copending application of Warren Dunham Foster and Frederick D. Sweet, Serial Number 613,664 filed concurrently herewith.

It is a feature of the present invention to provide simple, compact, inexpensive means for framing a picture upon a usual screen (not shown). Such means may include an adjustable mounting for the plate 17 on the frame 10 (Figure 1). To secure such a mounting the frame 10 may be formed with a wide guide slot for receiving the plate 17 which is made with a lengthwise slot 26 therein, and a stud 27 extends through the slot and a shoulder portion of a thumb nut 28 engages the plate 17, the shank of the stud being threaded for engagement by the nut. The nut 28 normally binds the plate 17 securely against the frame 10 and when it is desired to move the aperture 24 in framing a picture the nut 28 can be manually released and the plate 17 slid up or down a small amount by means of a hand piece 30 on the upper end of the plate 17. To hold the plate 17 in place, screws 31 may be threaded in the frame 10 at each side of the plate and have heads extending over the edges of the plate.

For feeding the film f intermittently between the gate sections 16 and 18, a claw member 33 may be pivotally mounted on a stub shaft 33' mounted on a carriage 34 which is movable up and down along a guide rod 35 which may be supported in ears 36 fastened to the frame 10. To cooperate with the guide rod 35 for guiding the carriage 34 along its work path a plate 37 may be fastened on the frame 10 and have an undercut slot whereby it forms a groove or track as illustrated in Figure 3 for receiving a forwardly extending portion of the carriage 34 which moves up and down in a plane parallel to the frame 10. The carriage may be inexpensively formed from sheet metal and have two secam follower portions 38 bent transversely to its body portion which will be positioned oppositely the shaft 13 of the motor M and have a suitable cut out portion 41 between the cam follower portions 38 through which the shaft may extend without interfering with the reciprocable movement of the carriage.

Mounted on an extension of the armature shaft 13 of the motor M is a cam 42 which is constructed for cooperation with the cam follower portions 38 on the carriage 34 to reciprocate the same in a vertical plane. A second cam 43 is mounted on the shaft 13 adjacent the cam 42 and is constructed for cooperation with an offset rearwardly extending cam follower member 44 of the claw member 33. A spring 45 is arranged normally to urge the claw member 33 against the cam 43 and away from the film f, which spring 45 may be conveniently mounted around the pivot shaft 33' on the carriage 34.

The claw member 33 may have teeth 47 of a usual kind, and operation of the motor will be effective through the cams 42 and 43 and their respective cam followers to move the teeth 47 through usual slots in the gate sections and through usual perforations in the film. Further operation of the motor will move the film downwardly in a well-known way and thereafter the spring 45 retracts the fingers from the film and the cam 42 then raises the fingers for beginning another cycle of the intermittent feeding movement.

According to the form of my invention described above in which the intermittent cams are mounted directly upon the armature shaft of the motor, thus simplifying and cheapening the apparatus still further, I choose a motor which operates at a speed of about 960 R.P.M., for a projector for use with silent pictures, or at 1,440 R.P.M., for a projector for use with pictures accompanied by sound. If a motor of higher speed is chosen, any suitable well known form of speed reduction may be employed between the motor and the shaft 13.

A simple barrel type shutter 50 may be inexpensively mounted on the end of the shaft 13 as illustrated in Figure 3 for cooperation with the above described intermittent feeding mechanism and the aperture 24. It will be noted that by this construction a relatively few compactly arranged parts mounted on the motor shaft 13 operate the intermittent film feeding mechanism and interrupt the light while the film is in motion. It will of course be understood by those skilled in the art that instead of using a barrel shutter in the form of a complete cylinder, the light intercepting portion or portions may be separately formed and mounted upon the shaft 13. It will be noted that the claw member 33 is largely disposed between the shutter 50 and the gate section 16 and the offset cam follower member 44 extends along one side of the shutter which arrangement compactly disposes the shutter in a nestable relation to the claw member.

It is a feature of the present invention to provide simple, inexpensive means for feeding the film without requiring the use of either an upper or a lower loop which are especially objectionable when a film handling apparatus is to be used by amateurs. In carrying out the improvements which characterize this feature of my invention, I lead the film f from the delivery reel 51 over a tensioning and auxiliary feeding device mounted on the frame 10 and positioned between the reel 51 and the upper end of the fixed gate section 16 which will be curved toward the reel 51, as illustrated in Figure 1. The tensioning device may include an arcuate member 52 mounted on a plunger rod 53 which is mounted for longitudinal movement in a bracket member 54 which may be fastened in a well-known way on the frame 10. A spring 55 coiled around the rod 53 and engaging against the lower end of the bracket 54 and against a pin 56 in the rod 53 is effective to urge the arcuate member 52 upwardly against the film as shown in Figure 1 and keeps the moving film under a slight tension. The principle of operation of such film-tensioning mechanism as is described above is explained more fully in the copending application of Warren Dunham Foster and Frederick D. Sweet, Serial Number 567,108, filed October 5, 1931, which shows an improvement upon the invention described and claimed in the copending application of Clarkson Ulysses Bundick and Barton Allen Proctor, Serial Number 44,482, filed July 18, 1925. A tensioning device 57 for that portion of the film extending between the lower end of the gate and a take up reel 58 may be mounted on the frame 10 and be a substantial duplicate of the parts constituting the feeding means adjacent the upper end of the gate.

For driving a take up reel 58, pulley 59 may be directly mounted on the shaft 13 and rotate the reel 57 by means of a pulley 60 on a suitable spindle of the reel and a spring belt 61 which will also function as a slip clutch. The belt 61 may pass through an elongated slot 59 in a flange member of the frame 10. As shown in Figure 1, the reels 51 and 57 may be mounted on integral arms of the frame 10. As the motor is operated and the film is intermittently fed through the gate the tensioning devices hereinabove described operate as described in the above mentioned applications and serve as a complete substitute for the conventional unsupported loops of slack film in that they furnish compensation for the differences in character of movement of the intermittent feeding mechanism and the masses of film upon the delivery and take-up reels.

For removing the film from the gate and threading a new film through the apparatus it is only necessary to move the handle 22 to the left as viewed in Figure 3 and move the film laterally out of the gate. In like manner the gate can be held open while the new film is threaded through it either endwise or laterally, or a conventional detent may be provided.

According to a preferred arrangement of the lamp house 15 and the motor M and the reels 51 and 58, these parts of the apparatus which are the heaviest operative parts mounted on the plate 10 are so positioned relative to each other that the common center of gravity of the heavy reel and lamp parts on the front of the plate 10 is disposed in or near a vertical extending plane through the center of gravity of the motor M at right angles to the frame 10. This cooperative positioning of the heavy parts mounted on the frame 10 increases the stability of the apparatus.

In addition to the advantages mentioned hereinbefore, other advantages result from the employment of an intermittent feeding movement, the reciprocating parts of which can be first mounted as a unit on a auxiliary guide member arranged to be thereafter mounted against the front side of the frame 10 adjacent the shaft 13 whereby cams on said shaft are disposed in operative relation to the feeding movement for operating it.

Another advantage results from the employment of an intermittent feeding movement which can be compactly disposed between the shutter on the end of the motor shaft and the frame 10 and have driven means disposed for engagement by cam driving means on the motor shaft between the shutter and the frame.

Still further advantages arise from the balanced relation between the motor and the lamp house. In order to operate the mechanism by an extension of the armature shaft, the motor must be mounted relatively high above the base. The position of the lamp housing upon the opposite side of the central mounting plate balances the weight of the motor. Moreover, the relatively heavy reels are also placed upon such opposite side of the central mounting plate so that the common center of gravity of the reels and lamp house cooperate with the center of gravity of the motor to give stability to the whole structure, in spite of the height of the motor above the base.

Still another advantage results from mounting most of the operating parts of the apparatus on a single shaft which furthermore is an extension of the motor shaft, thus reducing the number of parts of the apparatus and also the number of bearings to be lubricated.

Still another advantage arises from the organization of the operative parts of the apparatus so that all the revoluble parts except the reels may be mounted on the motor shaft.

I claim:

1. In a film handling apparatus, in combination, a single upright mounting plate, an openable gate having an aperture therethrough, means mounted on said plate for feeding a film through said gate past the aperture thereof, means for adjustably mounting said gate on said plate for bodily moving said gate and said aperture in relation to said feeding means for framing a picture, a motor for driving said feeding means mounted on said plate, and a barrel shutter mounted on the end of said motor shaft for cooperation with said aperture and said feeding means.

2. In a film handling apparatus, in combination, an apertured gate, means for feeding a film through said gate past the aperture thereof including a reciprocable claw member, a lens for focusing light in relation to said aperture, a motor for driving said feeding means having its armature shaft extending adjacent the path of the film through said gate parallel to said path, and a barrel shutter on said shaft arranged for cooperation with the film in said gate, said shaft and the shutter mounted thereupon being mounted between said lens and said gate.

3. In a film handling apparatus, in combination, an upright mounting plate, a gate having an aperture therethrough, means for mounting said gate directly on said plate, film feeding means mounted on said plate and including a reciprocable claw member, reciprocable means carried on said plate for guiding said claw member along its work path, a motor supported on said gate on the opposite side from said gate for driving said feeding means, said motor having its armature shaft extending through said plate and an over-size opening therefor in said reciprocable means, and a barrel shutter mounted on the shaft of said motor, beyond said reciprocable means for cooperation with said aperture and said feeding means.

4. The structure described in claim 3 characterized by a take-up spindle supported on said plate on the same side as said gate and means for driving said take-up spindle by said motor.

5. In a film handling apparatus, in combination, a gate having an aperture, a source of light for cooperation with said aperture, means for feeding a film intermittently past said aperture, said feeding means including a reciprocable claw member having an offset portion, a motor, cams on the shaft of said motor for operatively moving said claw member, and a barrel shutter on said motor shaft beyond said cams for intercepting the light passed to said aperture from said source, said shutter being disposed in a compact nestable relation to said claw member in the offset portion thereof.

6. In a film handling apparatus, in combination, an upright mounting plate, a gate having an aperture therein, two spaced film supporting members, means for mounting said gate upon said plate between said film supporting members, a film feeding means mounted upon said plate and including a reciprocable claw member, means mounted upon said plate for guiding said claw member along its work path, a motor supported upon said plate on the opposite side from said gate for driving said feeding means and having a shaft extending through said plate, a barrel shutter mounted on said motor shaft for cooperation with said aperture and said feeding means, and means mounted upon said plate for controlling the tension of the section of the film extending between one of said supporting members and said gate.

7. In a film handling apparatus, a single upright mounting plate, a base therefor, a delivery reel and a take-up reel below said delivery reel, an intermittent feeding means for the film disposed between said reels, a revoluble member for driving said take-up reel, a revoluble member for driving said feeding means, and an electric motor mounted upon said single upright mounting plate above said base, said member for driving said take-up reel, said member for driving said feeding means, and said shutter being mounted upon the armature shaft of said motor and said intermittent feeding means being mounted upon said plate.

8. In a film handling apparatus, in combination, a gate, means for feeding a film through said gate including a carriage reciprocable in a path parallel to said gate and normal to the optical axis of the apparatus, guiding means for said carriage, said carriage being movable along said guiding means, a claw member mounted upon said carriage for bodily movement relative thereto, devices for reciprocating said carriage and moving said claw member toward and from said gate, a motor mounted adjacent said gate and having a shaft extending to a point adjacent a plane vertical to the optical axis of said apparatus, and devices including two closely spaced cams on said shaft for driving said feeding means, one of said cams operating said carriage and the other of said cams operating said claw member.

9. The structure described in claim 8 characterized by a barrel shutter compactly positioned on said shaft adjacent said claw member for cooperation with said gate.

10. In a film handling apparatus, in combination, an upright mounting plate, a gate having an aperture therethrough, means for mounting said gate directly on said plate, film feeding means mounted on said plate and including a reciprocable claw member and a resilient film engaging member on each side of said claw member for controlling the tension of the film, reciprocable means carried on said plate for guiding said claw member along its work path, a motor supported on said plate on the opposite side from said gate for driving said feeding means, said motor having its armature shaft extending through said plate, said shaft extending through said reciprocable means, said reciprocable means having an oversize opening for said shaft, and a barrel shutter mounted on said shaft between said resilient members for cooperation with said aperture and said feeding means.

WARREN DUNHAM FOSTER.